United States Patent
Miyamoto et al.

(10) Patent No.: US 7,877,190 B2
(45) Date of Patent: Jan. 25, 2011

(54) FUEL CONTROL DEVICE FOR INTERNAL COMBUSTION ENGINE

(75) Inventors: Katsuhiko Miyamoto, Funai-gun (JP); Tetsuya Watanabe, Okazaki (JP); Masashi Takahashi, Obu (JP); Kinichi Iwachido, Aichi-gun (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 125 days.

(21) Appl. No.: 12/361,893

(22) Filed: Jan. 29, 2009

(65) Prior Publication Data
US 2009/0240421 A1  Sep. 24, 2009

(30) Foreign Application Priority Data
Mar. 24, 2008  (JP) ............................. 2008-075679

(51) Int. Cl.
*G06F 19/00* (2006.01)
*F02D 41/00* (2006.01)
(52) U.S. Cl. ...................... 701/103; 701/110; 123/672
(58) Field of Classification Search ......... 701/102–105, 701/108, 110, 114, 115; 123/672, 687, 688, 123/674
See application file for complete search history.

(56) References Cited

U.S. PATENT DOCUMENTS

| 5,003,955 | A | * | 4/1991 | Haraguchi et al. | 123/675 |
| 5,678,402 | A | * | 10/1997 | Kitagawa et al. | 60/276 |
| 6,058,906 | A | * | 5/2000 | Yoshino | 123/295 |
| 6,668,813 | B2 | * | 12/2003 | Azuma et al. | 123/687 |

FOREIGN PATENT DOCUMENTS

| JP | 7-103016 A | 4/1995 |
| JP | 2841806 B2 | 10/1998 |
| JP | 2004-183579 A | 7/2004 |

\* cited by examiner

*Primary Examiner*—John T Kwon
(74) *Attorney, Agent, or Firm*—Birch, Stewart, Kolasch & Birch, LLP

(57) ABSTRACT

A fuel control device for an internal combustion engine determines that the internal combustion engine is in a transient state, by a criterion D, and makes fuel correction, where the transient-state criterion D is set to be a more relaxed criterion ($=|\Delta THaf|$) when forcible modulation control is being performed, compared with a normal criterion ($=|\Delta THn|$) used when the forcible modulation control is not being performed.

5 Claims, 5 Drawing Sheets

FUEL CONTROL DEVICE FOR INTERNAL COMBUSTION ENGINE

BACKGROUND OF THE INVENTION

1. Field of the Invention

This invention relates to a fuel control device for an internal combustion engine, and specifically, transient control under forcible modulation control which oscillates air-fuel ratio between rich and lean values.

2. Description of the Related Art

As air-fuel ratio control in an engine (internal combustion engine), there is known forcible modulation control which oscillates combustion air-fuel ratio between rich and lean values with a predetermined amplitude, thereby forcibly oscillating exhaust air-fuel ratio.

Performing such forcible modulation control, for example when a catalytic converter provided in an exhaust passage of an engine is already activated, enables an improvement of exhaust clean-up performance by use of $O_2$ storage function and HC storage function of the catalytic converter. Performing such forcible modulation control, for example when the engine is cold-started and the catalytic converter is not activated yet, immediately after the engine is started, in particular, enables promoted rise in catalyst temperature through forcibly-caused reduction reaction and oxidation reaction.

With an engine installed on a vehicle, there is, however, a problem that under such forcible modulation control, the engine manipulated to accelerate or decelerate in order to accelerate or decelerate the vehicle shows lowered transient responsiveness. Specifically, if the engine is manipulated to accelerate when the combustion air-fuel ratio is at a lean value, fuel correction cannot be made in time, which leads to a delay in increase in engine speed and torque, therefore, unsatisfactory acceleration and lowered drivability, and also to an increase in HC emissions due to misfire. On the other hand, if the engine is manipulated to decelerate when the combustion air-fuel ratio is at a rich value, fuel correction likewise cannot be made in time, which leads to excessive consumption of fuel, therefore, an increase in HC emissions and a decrease in gas mileage.

In this view, there has been developed a device which forbids the forcible modulation control when detecting the engine's being in an acceleration or deceleration state under the forcible modulation control (dither control) (see published Japanese Patent No. 2841806).

However, in the device disclosed in this publication, configured to forbid the forcible modulation control when detecting the engine's being in an acceleration or deceleration state under the forcible modulation control, if it takes time to determine that the engine is in an acceleration or deceleration state, it after all leads to bad transient responsiveness, thus, lowered drivability and gas mileage.

Further, the device disclosed in this publication forbids the forcible modulation control when detecting the engine's being in an acceleration or deceleration state under the forcible modulation control, which means that the forcible modulation control is not performed at all while the engine is in an acceleration or deceleration state, or in other words, in a transient state. This is, however, not desirable. For example, if the engine is manipulated to accelerate or decelerate while the forcible modulation control is being performed to raise the catalyst temperature immediately after cold start of the engine, the forcible modulation control is suspended while the engine is in an acceleration or deceleration state, so that the raising of the catalyst temperature is suspended, so that the activation of the catalyst converter is delayed.

SUMMARY OF THE INVENTION

The present invention has been made to solve the problems as mentioned above. The primary object thereof is to provide a fuel control device for an internal combustion engine capable of preventing the lowering of the transient responsiveness under the forcible modulation control.

In order to achieve the above object, a fuel control device for an internal combustion engine according to the present invention comprises an air-fuel ratio setting means which sets combustion air-fuel ratio depending on the operating state of the internal combustion engine, a standard fuel quantity setting means which sets standard fuel quantity on the basis of the combustion air-fuel ratio set by the air-fuel ratio setting means, a transient state determination means which determines whether or not the internal combustion engine is in a transient state, by a criterion, a fuel correction means which makes correction to the standard fuel quantity when the transient state determination means determines that the internal combustion engine is in a transient state, and an air-fuel ratio modulation means which oscillates the combustion air-fuel ratio of the internal combustion engine between rich and lean values, periodically, thereby oscillating exhaust air-fuel ratio between rich and lean values, periodically, wherein the transient state determination means includes a criterion setting means which sets said criterion, and the criterion setting means sets said criterion such that when the exhaust air-fuel ratio is being oscillated by the air-fuel ratio modulation means, whether or not the internal combustion engine is in a transient state is determined by a relaxed criterion, compared with when the exhaust air-fuel ratio is not being oscillated.

Under the forcible modulation control, the combustion air-fuel ration varies, which is likely to lead to lowered transient responsiveness. According to the present invention, however, the criterion for determining whether or not the internal combustion engine is in a transient state is relaxed in such situation, compared with the normal situation. This enables earlier detection of the internal combustion engine's being in a transient state, thus, prompt correction to the standard fuel quantity, thereby providing improved transient responsiveness under the forcible modulation control.

For example, when the transient state means an acceleration or deceleration state, relaxing the criterion compared with the normal situation enables earlier detection of the internal combustion engine's being in an acceleration state and prompt correction to the standard fuel quantity to increase fuel, as well as earlier detection of the internal combustion engine's being in a deceleration state and prompt correction to the standard fuel quantity to decrease fuel.

BRIEF DESCRIPTION OF THE DRAWINGS

The present invention will become more fully understood from the detailed description given hereinafter and the accompanying drawings which are given by way of illustration only, and thus, are not limitative of this invention, and wherein.

DETAILED DESCRIPTION OF THE PREFERRED EMBODIMENTS

Figure 1:
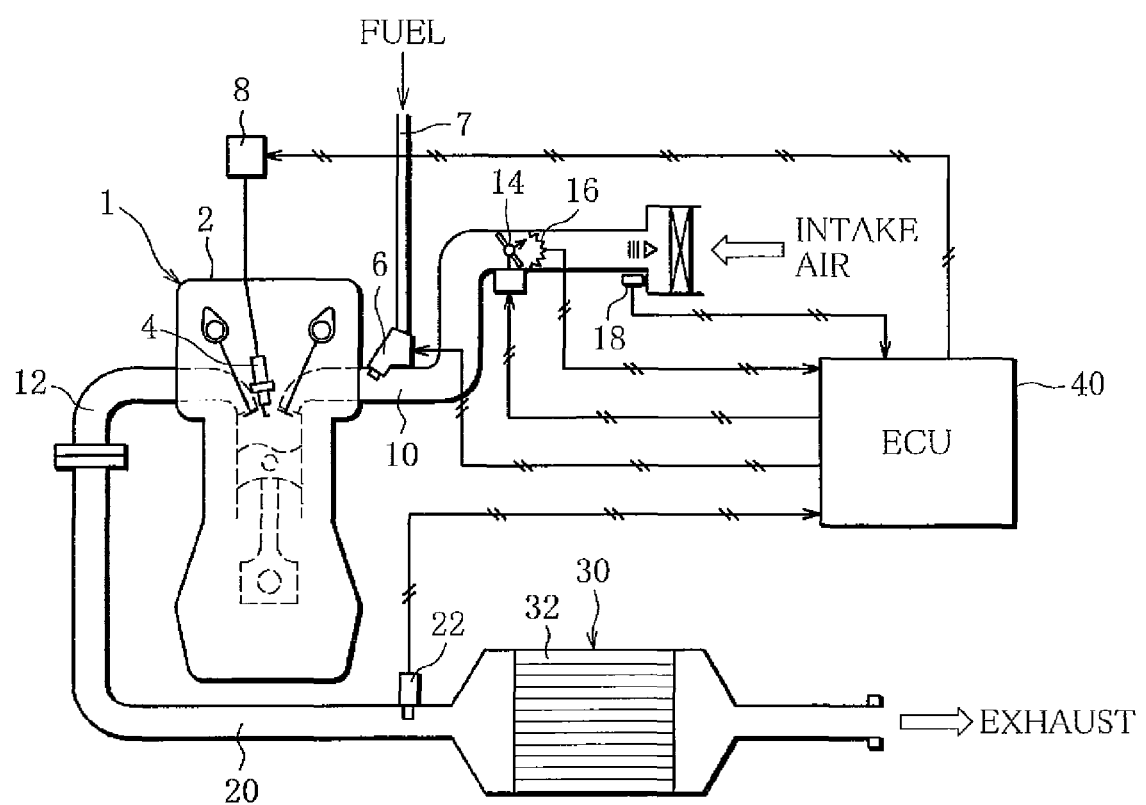
FIG. 1 is a diagram schematically showing the structure of a fuel control device for an internal combustion engine according to the present invention, installed on a vehicle.

Referring to the drawings attached, embodiments of the present invention will be described.

FIG. 1 schematically shows the structure of a fuel control device for an internal combustion engine according to the present invention, installed on a vehicle. The structure of this fuel control device will be described below.

As shown in FIG. 1, a multi point injection (MPI) four-cylinder gasoline engine is adopted as an engine body (hereinafter referred to simply as an engine) 1 which is an internal combustion engine.

Spark plugs 4 are provided for the respective cylinders and fitted to a cylinder head 2 of the engine 1. The spark plugs 4 are each connected to an ignition coil 4 which generates high voltage.

The cylinder head 2 has intake ports formed for the respective cylinders, and an intake manifold 10 is connected to the intake ports, at one end. An electromagnetic fuel injection valve 6 is fitted to the intake manifold 10. The fuel injection valve 6 is connected by a fuel pipe 7 to a fuel supply device (not shown) including a fuel tank.

In the intake manifold 10, upstream of the fuel injection valve 6, an electromagnetic throttle valve 14 regulating intake air quantity and a throttle position sensor (TPS) detecting the opening θth of the throttle valve 14 are provided. Upstream of the throttle valve 14, an air flow sensor 18 measuring intake air quantity Qair is further provided. As the air flow sensor 18, a Karman vortex air flow sensor is used.

The cylinder head 2 has also exhaust ports formed for the respective cylinders, and an exhaust manifold 12 is connected to the exhaust ports 12, at one end.

Since the MPI engine is publicly known, the detailed description of its structure will be omitted.

The exhaust manifold is connected to an exhaust pipe 20, at the other end. In the exhaust pipe 20, a catalytic exhaust clean-up device 30 containing a three-way catalyst 32 is provided.

Upstream of the three-way catalyst 32, an air-fuel ratio sensor 22 detecting $O_2$ concentration of exhaust, thereby detecting exhaust air-fuel ratio is fitted to the exhaust pipe 20. For the air-fuel sensor 22, an $O_2$ sensor is adopted, for example.

An ECU (electronic control unit) 40 includes an input-output device, memory (ROM, RAM, etc.), a central processing unit (CPU), a timer counter, etc. The ECU 40 constituting the fuel control device performs general control of the engine 1, including fuel control.

To the input of the ECU 40, various sensors, including the aforementioned TPS 16, air flow sensor 18 and air-fuel ratio sensor 22, are connected, and information detected by these sensors is provided to the ECU 40.

To the output of the ECU 40, various output devices, including the aforementioned fuel injection valve 6, ignition coils 8 and throttle valve 14, are connected, and the ECU 40 provides fuel injection quantity, fuel injection timing, ignition timing, etc. calculated on the basis of information detected by the sensors, to these output devices. Specifically, an appropriate target for combustion air-fuel ratio (combustion A/F) is set on the basis of information detected by the sensors (air-fuel ratio setting means), a fuel quantity (standard fuel quantity) is set according to this target air-fuel ratio so that fuel in the set quantity is injected by the fuel injection valve 6 according to appropriate timing (standard fuel quantity setting means), the throttle valve 14 is regulated to an appropriate opening, and the spark plugs 4 are controlled to effect spark ignition according to appropriate timing.

When the engine 1 is manipulated to accelerate or decelerate, for example in order to accelerate or decelerate the vehicle, the ECU 40 determines that the engine 1 is in an acceleration or deceleration state, from information from the TPS 16 (transient state determination means). When determining that the engine 1 is in an acceleration or deceleration state, the ECU 40 temporarily makes transient fuel correction to the fuel quantity based on the target air-fuel ratio (standard fuel quantity). For example, when the engine 1 is in an acceleration state, the ECU 40 makes correction to increase fuel in accordance with the detected acceleration state, and when the engine 1 is in a deceleration state, the ECU 40 makes correction to decrease fuel in accordance with the detected deceleration state (fuel correction means). By this, in the transient state of the engine 1, unsatisfactory acceleration or deceleration, etc. can be prevented.

Further, the fuel control device according to the present invention is so configured that the ECU 40 can perform forcible modulation control which forcibly oscillates the combustion A/F between rich and lean values, for example with a stoichiometric ratio as a central value, periodically, thereby forcibly oscillating the exhaust air-fuel ratio (exhaust A/F) between rich and lean values, periodically (air-fuel ratio modulation means) Performing the forcible modulation control on the occasions such that the engine 1 is cold-started, for example, can forcibly cause reduction reaction and oxidation reaction on the three-way catalyst 32 even though the three-way catalyst 32 is not activated yet, thereby promoting rise in catalyst temperature, thus achieving early activation of the three-way catalyst 32.

In such forcible modulation control, the exhaust A/F varies between rich and lean values. Thus, when the engine 1 is manipulated to accelerate or decelerate, therefore is in a transient state, transient fuel correction is liable to be late, which can particularly lead to unsatisfactory acceleration or deceleration, thus, bad transient responsiveness. The fuel control device according to the present invention intends to prevent lowering of transient responsiveness under the forcible modulation control. Next, fuel control under the forcible modulation control, performed by the fuel control device according to the present invention, will be described.

First, a first embodiment will be described.

Figure 2:
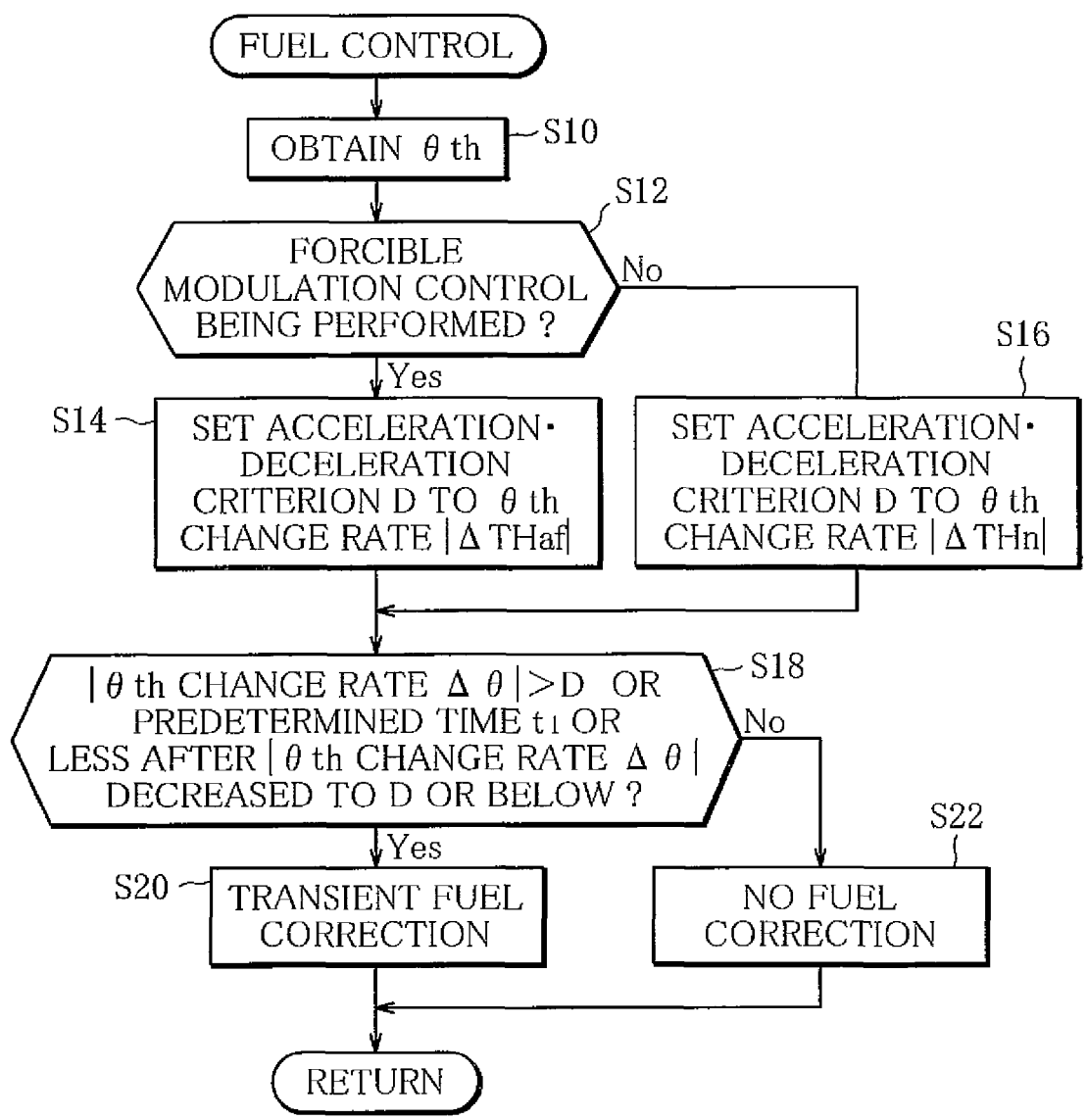
FIG. 2 is a flowchart showing a fuel control routine in a first embodiment of the present invention.

FIG. 2 is a flowchart showing a fuel control routine in the first embodiment of the present invention. The description will be given according to this flowchart.

At step S10, throttle opening θth is obtained from information from the TPS 16.

At step S12, whether or not the forcible modulation control is being performed is determined. If the result of determination is true (Yes), i.e., it is determined that the forcible modulation control is being performed, the flow of control goes to step S14. If the result of determination is false (No), i.e., it is determined that the forcible modulation control is not being performed, the flow of control goes to step S16.

As mentioned above, when the engine 1 is manipulated to accelerate or decelerate, transient fuel correction is made. Specifically, when the absolute value of rate Δθ of change of throttle opening θth is greater than an acceleration•deceleration criterion (criterion) D, it is determined that the engine 1 is in an acceleration or deceleration state and transient fuel correction is made. At steps S14, S16, this criterion, or acceleration•deceleration criterion D is set differently depending on whether or not the forcible modulation control is being performed (criterion setting means).

When the forcible modulation control is being performed, the acceleration•deceleration criterion D is set to the absolute value of a rate ΔTHaf of change of throttle opening θth predetermined as a criterion under the forcible modulation control, at step S14. When, on the other hand, the forcible modulation control is not being performed, the acceleration•deceleration criterion D is set to the absolute value of a normal criterion rate ΔTHn of change of throttle opening θth, at step S16. Specifically, the absolute value of the change rate ΔTHaf predetermined as a criterion under the forcible modulation control is lower than the absolute value of the normal criterion change rate ΔTHn (|ΔTHaf|<|ΔTHn|). Thus, under the forcible modulation control, the acceleration•deceleration criterion D is set to a smaller value than normal.

At step S18, using the acceleration•deceleration criterion D thus set, there is determined whether or not the absolute value of rate Δθ of change of throttle opening θth, detected just now, is greater than the acceleration•deceleration criterion D, or it is a predetermined time t1 or less after determining that the absolute value of rate Δθ of change of throttle opening θth has decreased from above the acceleration•deceleration criterion D to the acceleration•deceleration criterion D or below. If the result of determination is true (Yes), i.e., it is determined that the absolute value of rate Δθ of change of throttle opening θth, detected just now, is greater than the acceleration•deceleration criterion D or it is the predetermined time t1 or less after determining that the absolute value of rate Δθ of change of throttle opening θth has decreased to the acceleration•deceleration criterion D or below, it may be determined that the engine 1 is in an acceleration or deceleration state, thus, in a transient state. In this case, the flow of control goes to step S20, and transient fuel correction is made.

If, on the other hand, the result of determination at step S18 is false (No), i.e., it is determined that the absolute value of rate Δθ of change of throttle opening θth, detected just now, is the acceleration•deceleration criterion D or below or it is more than the predetermined time t1 after determining that the absolute value of rate Δθ of change of throttle opening θth has decreased to the acceleration•deceleration criterion D or below, it may be determined that the engine 1 is not in an acceleration or deceleration state. In this case, the flow of control goes to step S22, so that fuel correction is not made.

As stated above, in the fuel control in the first embodiment of the present invention, the acceleration•deceleration criterion D by which whether or not the engine 1 is in an acceleration or deceleration state is set to the value |ΔTHaf| during the forcible modulation control, which value is lower than the normal value |ΔTHn|. This facilitates the detection of the engine's being in an acceleration or deceleration state.

Accordingly, in this fuel control, under the forcible modulation control, the engine 1's being in an acceleration or deceleration state is detected earlier than normal, which enables the transient fuel correction to be conducted promptly.

This prevents the transient fuel correction from being late, even when the engine 1 under the forced modulation control is manipulated to accelerate or decelerate, thus comes into an acceleration or deceleration state, namely a transient state, thereby preventing unsatisfactory acceleration or deceleration and providing improved transient responsiveness.

Particularly, on the occasions such that the engine 1 is cold-started and subjected to the forcible modulation control, this fuel control can promote early activation of the three-way catalyst 32, uninterruptedly, while providing the improved transient responsiveness.

Figure 3:
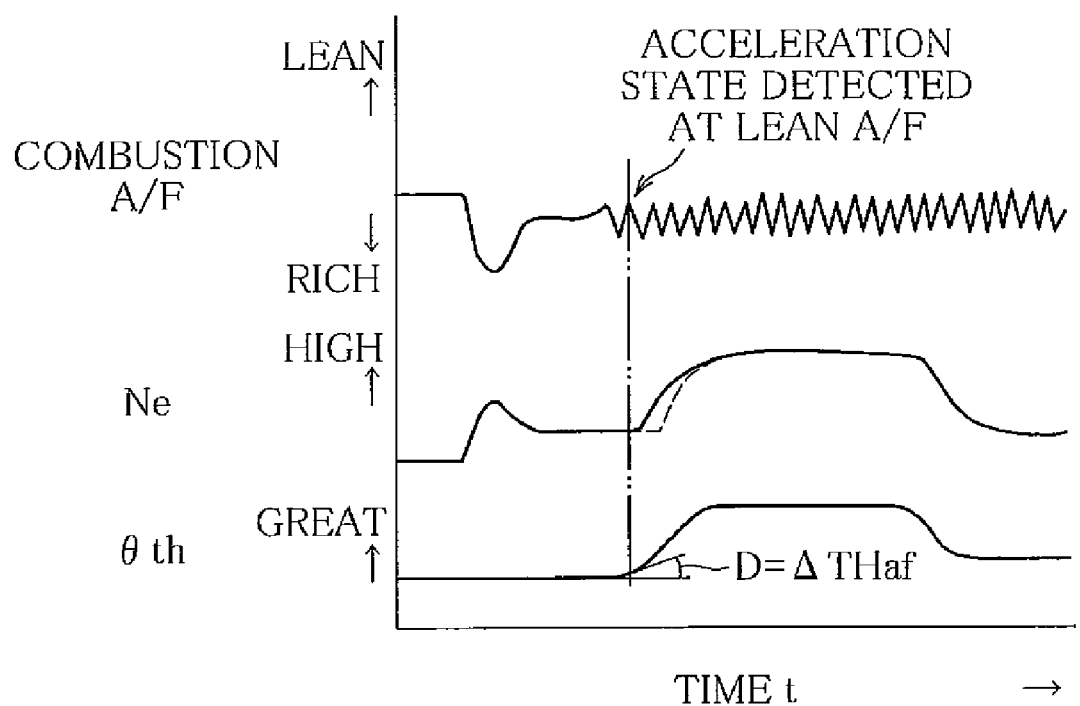
FIG. 3 is a time chart showing an example of relation among combustion air-fuel ratio, throttle opening θth and engine speed Ne, in fuel control according to the control routine of FIG. 2.

FIG. 3 is a time chart showing an example of relation among combustion A/F, throttle opening θth and engine speed Ne, in fuel control according to the above-described control routine. In FIG. 3, indicated in solid line is variation of the engine speed Ne in the case where, when the combustion A/F subjected to the forcible modulation control was at a lean value, it was determined that the engine was in an acceleration state, on the basis of the acceleration•deceleration criterion D set to the value |ΔTHaf|, and transient fuel correction was made. For comparison, variation of the engine speed Ne in the case where the determination was made using the acceleration•deceleration criterion D set to the normal value |ΔTHn| and transient fuel correction was made is indicated in broken line. The comparison shows that setting the acceleration•deceleration criterion D to be lower than normal can prevent unsatisfactory acceleration under the forcible modulation control, and therefore prevent lowering of drivability when the engine 1, thus the vehicle is accelerated under the forcible modulation control. This can also prevent an increase in HC emissions due to misfire.

Although not indicated in the time chart, even when the combustion A/F subjected to the forcible modulation control is at a rich value, determining that the engine is in a deceleration state, on the basis of the acceleration•deceleration criterion D set to the value |ΔTHaf| lower than normal, and making transient fuel correction can prevent an increase in HC emissions and a decrease in gas mileage, which otherwise tend to occur when the engine 1, thus the vehicle is decelerated under the forcible modulation control.

In the described embodiment, when the engine is under the forcible modulation control, the acceleration•deceleration criterion D is always set to the value |ΔTHaf|. However, the problems caused by lowering of transient responsiveness are prominent in the case where the engine 1 is manipulated to accelerate when the combustion A/F is at a lean value under the forcible modulation control, and in such case, use of the acceleration•deceleration criterion D set to the value |ΔTHaf| can prevent lowering of drivability and an increase in HC emissions due to misfire, as FIG. 3 shows. Thus, it may be modified such that only when the to combustion A/F subjected to the forcible modulation control is at a lean value, only whether or not the engine is in an acceleration state is determined by the acceleration•deceleration criterion D set to the value |ΔTHaf|.

This can provide effectively-improved acceleration responsiveness under the forcible modulation control and satisfactorily prevent lowering of drivability and an increase in HC emissions due to misfire.

Next, a second embodiment will be described.

Figure 4:
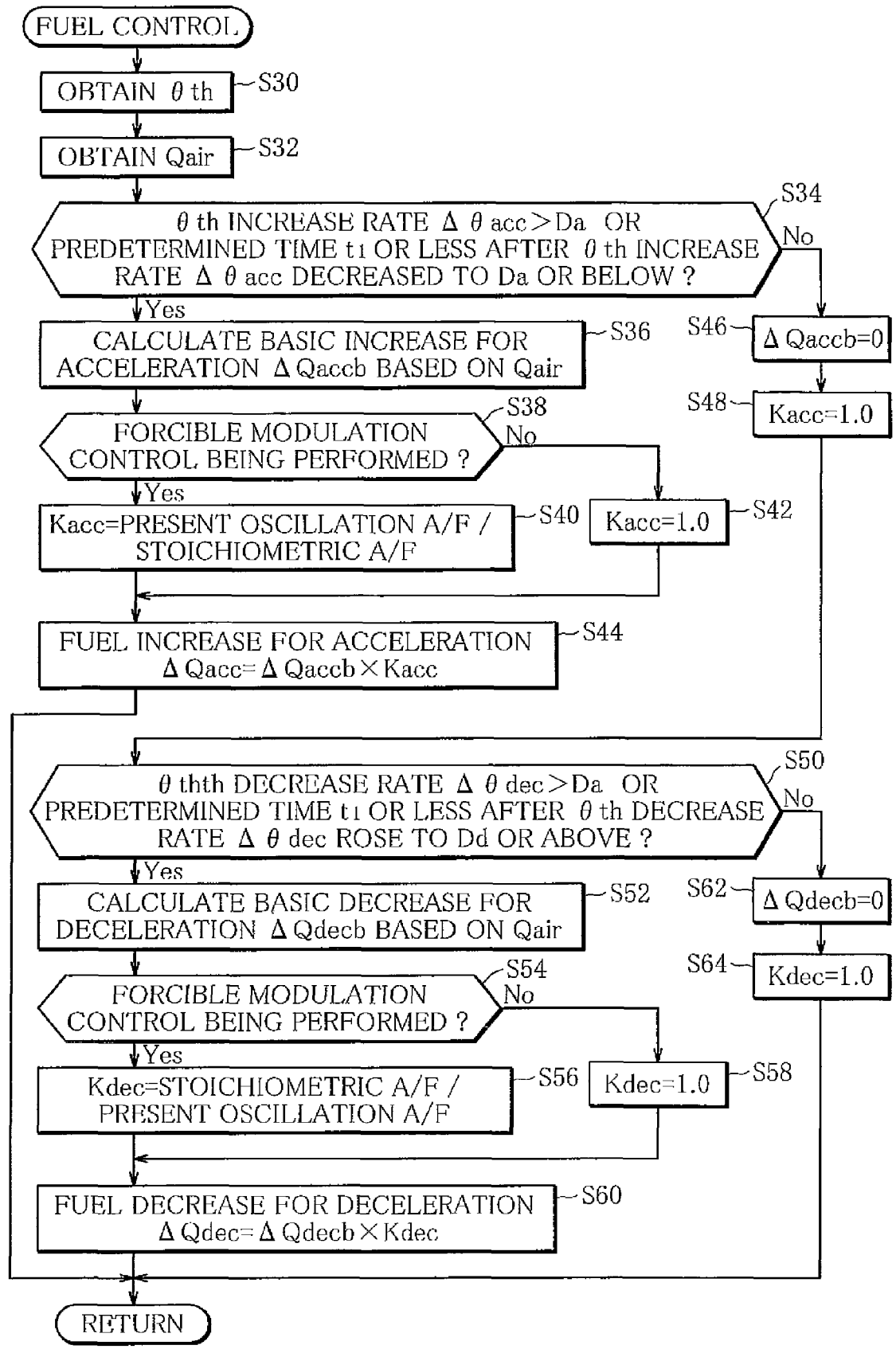
FIG. 4 is a flowchart showing a fuel control routine in a second embodiment of the present invention.

FIG. 4 is a flowchart showing a fuel control routine in the second embodiment of the present invention. The description will be given according to this flowchart.

At step S30, throttle opening θth is obtained from information from the TPS 16.

At step S32, intake air quantity Qair is obtained from information from the air flow sensor 18.

At step S34, there is determined whether or not the rate Δθacc of increase of throttle opening θth, detected just now, is greater than an acceleration criterion (criterion) Da or it is a predetermined time t1 or less after determining that the rate Δθacc of increase of throttle opening Δθ has decreased from above the acceleration criterion Da to the acceleration criterion Da or below.

Here, it is desirable that the acceleration criterion Da be set depending on whether or not the forcible modulation control is being performed, specifically set to a value ΔTHaf lower than a normal value ΔTHn, when the forcible modulation control is being performed, as in the first embodiment. The acceleration criterion Da may, however, be the normal criterion rate ΔTHn of change of throttle opening θth used in the first embodiment, regardless of whether or not the forcible modulation control is being performed.

If the result of determination at step S34 is true (Yes), i.e., it is determined that the rate Δθacc of increase of throttle opening θth, detected just now, is greater than the acceleration•criterion Da or it is the predetermined time t1 or less after determining that the rate Δθacc of increase of throttle opening θth has decreased to the acceleration criterion Da or below, it may be determined that the engine 1 is in an acceleration state, thus, in a transient state. In this case, the flow of control goes to step S36.

At step S36, in order to make transient fuel correction based on the intake flow quantity Qair, basic fuel increase ΔQaccb for acceleration (normal acceleration correction quantity) is calculated. It may be configured such that the basic fuel increase ΔQaccb for acceleration is read from a map prepared in advance.

At step S38, whether or not the forcible modulation control is being performed is determined. If the result of determination is true (Yes), i.e., it is determined that the forcible modulation control is being performed, the flow of control goes to step S40.

At step 40, increase factor Kacc is calculated from equation (1):

$$Kacc = (\text{present oscillation } A/F)/(\text{stoichiometric } A/F) \quad (1)$$

This means that when the engine 1 is in an acceleration state, the increase factor Kacc is set depending on the combustion A/F varying under the forcible modulation control, specifically set to be smaller (<1.0) if the present oscillation A/F is rich, and greater (>1.0) if the present oscillation A/F is lean.

If, on the other hand, the result of determination at step S38 is false (No), i.e., it is determined that the forcible modulation control is not being performed, the flow of control goes to step S42 and the increase factor Kacc is set to 1.0.

Then, at step S44, fuel increase ΔQacc for acceleration (acceleration correction quantity) is calculated using the increase factor Kacc thus set, from equation (2):

$$\Delta Qacc = \Delta Qaccb \times Kacc \quad (2)$$

Thus, when the engine 1 under the forcible modulation control is manipulated to accelerate, or in other words, placed in an acceleration state, the fuel increase ΔQacc for acceleration is set to be smaller than the basic fuel increase ΔQaccb for acceleration if the present oscillation A/F is rich, and greater then the basic fuel increase ΔQaccb for acceleration if the present oscillation A/F is lean. The fuel increase ΔQacc for acceleration is held at the basic fuel increase ΔQaccb for acceleration when the forcible modulation control is not being performed.

If the result of determination at step S34 is false (No), i.e., it is determined that the rate Δθacc of increase of throttle opening θth, detected just now, is the acceleration•criterion Da or below or it is more than the predetermined time t1 after determining that the rate Δθacc of increase of throttle opening θth has decreased to the acceleration criterion Da or below, it may be determined that the engine 1 is not in an acceleration state. In this case, the flow of control goes to step 346, where the basic fuel increase ΔQaccb for acceleration and the fuel increase ΔQacc for acceleration are set to 0, then to step S48, where the increase factor Kacc is set to 1.0, and then to step S50.

At step S50, there is determined whether or not the rate Δθdec of decrease of throttle opening θth, detected just now, is smaller than a deceleration criterion (criterion) Dd or it is a predetermined time t1 or less after determining that the rate Δθdec of decrease of throttle opening θth has risen from below the deceleration criterion Dd to the deceleration criterion Da or above.

Here, it is desirable that the deceleration criterion Dd be set depending on whether or not the forcible modulation control is being performed, specifically set to a value ΔTHaf the absolute value of which is smaller than the absolute value of a normal value ΔTHn, when the forcible modulation control is being performed, as in the first embodiment. As with the acceleration criterion described above, the deceleration criterion Dd may, however, be the normal criterion rate ΔTHn of change of throttle opening θth used in the first embodiment, regardless of whether or not the forcible modulation control is being performed.

If the result of determination at step S50 is true (Yes), i.e., it is determined that the rate Δθdec of decrease of throttle opening θth, detected just now, is smaller than the deceleration•criterion Dd or it is the predetermined time t1 or less after determining that the rate Δθdec of decrease of throttle opening θth has risen to the deceleration criterion Dd or above, it may be determined that the engine 1 is in a deceleration state thus, in a transient state. In this case, the flow of control goes to step S52.

At step S52, in order to make transient fuel correction based on the intake flow quantity Qair, basic fuel decrease ΔQdecb for deceleration (normal deceleration correction quantity) is calculated. It may be configured such that the basic fuel decrease ΔQaccb for deceleration is read from a map prepared in advance.

At step S54, whether or not the forcible modulation control is being performed is determined. If the result of determination is true (Yes), i.e., it is determined that the forcible modulation control is being performed, the flow of control goes to step S56.

At step 56, decrease factor Kdec is calculated from equation (3):

$$Kdec = (\text{stoichiometric } A/F)/(\text{present oscillation } A/F) \quad (3)$$

This means that when the engine 1 is in a deceleration state, the decrease factor Kdec is set depending on the combustion A/F varying under the forcible modulation control, specifically set to be greater (>1.0) if the present oscillation A/F is rich, and smaller (<1.0) if the present oscillation A/F is lean.

If, on the other hand, the result of determination at step S54 is false (No), i.e., it is determined that the forcible modulation control is not being performed, the flow of control goes to step S58 and the decrease factor Kdec is set to 1.0.

Then, at step S60, fuel decrease ΔQdec for deceleration (deceleration correction quantity) is calculated using the decrease factor Kdec thus set, from equation (4):

$$\Delta Qdec = \Delta Qdecb \times Kdec \quad (4)$$

Thus, when the engine 1 under the forcible modulation control is manipulated to decelerate, or in other words, placed in a deceleration state, the fuel decrease ΔQdec for deceleration is set to be greater than the basic fuel decrease ΔQdec for deceleration if the present oscillation A/F is rich, and smaller than the basic fuel decrease ΔQdec for deceleration if the present oscillation A/F is lean. The fuel decrease ΔQdec for deceleration is held at the basic fuel decrease ΔQdec for deceleration when the forcible modulation control is not being performed.

If the result of determination at step S50 is false (No), i.e., it is determined that the rate Δθdec of decrease of throttle opening θth, detected just now, is the deceleration•criterion Dd or above or it is more than the predetermined time t1 after determining that the rate Δθacc of decrease of throttle opening θth has risen to the deceleration criterion Da or above, it may be determined that the engine 1 is not in a deceleration state. In this case, the flow of control goes to step S62, where the basic fuel decrease ΔQdecb for deceleration and the fuel decrease ΔQdec for deceleration are set to 0, and then to step S64, where the decrease factor Kdec is set to 1.0.

As described above, in the fuel control in the second embodiment of the present invention, when the engine 1 is in a transient state, transient fuel correction is made with the fuel increase ΔQacc for acceleration or fuel decrease ΔQdec for deceleration varied depending on the present oscillation A/F under the forcible modulation control. Specifically, when the engine 1 is in an acceleration state, the fuel increase ΔQacc for acceleration is set to be smaller than the basic fuel increase ΔQaccb for acceleration if the present oscillation A/F is rich, and greater if the present oscillation A/F is lean. When, on the other hand, the engine 1 is in a deceleration state, the fuel decrease ΔQdec for deceleration is set to be greater than the basic fuel decrease ΔQdecb for deceleration if the present oscillation A/F is rich, and smaller if the present oscillation A/F is lean.

Thus, the above-described fuel control can supply sufficient fuel if the engine 1 under the forcible modulation control is placed in an acceleration state when the present oscillation A/F is lean, and can supply reduced fuel if the engine 1 under the forcible modulation control is placed in a deceleration state when the present oscillation A/F is rich.

In other words, the present fuel control enables the transient fuel correction to be performed appropriately even when the engine 1 under the forcible modulation control is placed in an acceleration or deceleration state, thus in a transient state, thereby preventing unsatisfactory acceleration or deceleration and providing improved transient responsiveness.

Figure 5:
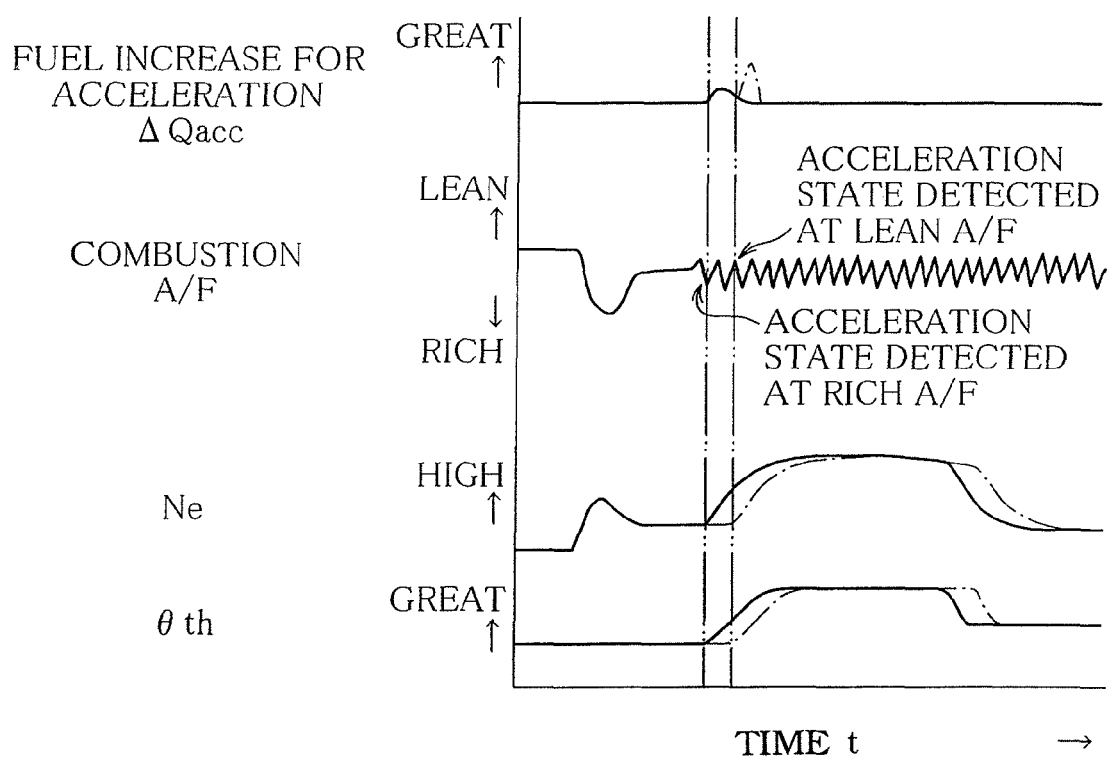
FIG. 5 is a time chart showing an example of relation among combustion air-fuel ratio, throttle opening θth, fuel increase for acceleration ΔQacc and engine speed Ne, in fuel control according to the control routine of FIG. 4.

FIG. 5 is a time chart showing an example of relation among combustion A/F, throttle opening θth, fuel increase ΔQacc for acceleration and engine speed Ne, in fuel control according to the above-described control routine. In FIG. 5, indicated in solid line is variation of the fuel increase ΔQacc for acceleration and of the engine speed Ne in the case where, when the combustion A/F subjected to the forcible modulation control was at a lean value, it was determined that the engine was in an acceleration state, and transient fuel correction was made. Indicated in long and short dash line is, on the other hand, variation of the fuel increase ΔQacc for acceleration and of the engine speed Ne in the case where, when the combustion A/F subjected to the forcible modulation control was at a rich value, it was determined that the engine was in an acceleration state, and transient fuel correction was made. The time chart shows that, by setting the fuel increase ΔQacc for acceleration to be smaller when the combustion A/F is at a rich value, and greater when the combustion A/F is at a lean value, unsatisfactory acceleration is prevented under the forcible modulation control. Consequently, when the engine 1, thus the vehicle is accelerated under the forcible modulation control, lowering of drivability and an increase in HC emissions due to misfire can be prevented.

Although not indicated in the time chart, when it is determined that the engine 1 under the forcible modulation control is in a deceleration state, setting the fuel decrease ΔQdec for deceleration to be greater if the combustion A/F is at a rich value, and smaller if the combustion A/F is at a lean value can prevent an increase in HC emissions and a decrease in gas mileage, which otherwise tends to occur when the engine 1, thus the vehicle is decelerated under the forcible modulation control.

If, in addition, the acceleration criterion Da and the deceleration criterion Dd are set to a value ΔTHaf the absolute value of which is lower than the absolute value of a normal value ΔTHn, when the forcible modulation control is being performed, this can provide the same beneficial effect as in the first embodiment, thus, further improved transient responsiveness In the above, fuel control devices for an internal combustion engine as embodiments of the present invention have been described. The present invention is, however, not limited to the described embodiments.

For example, in the first embodiment, when the forcible modulation control is being performed, whether or not the engine is in an acceleration or deceleration state is determined on the basis of the acceleration•deceleration criterion D set to the value |ΔTHaf| lower than the normal value |ΔTHn|, and the forcible modulation control is continued. If, however, there is no need to continue the forcible modulation control, the forcible modulation control may be stopped after determining whether or not the engine is in an acceleration or deceleration state. Also in this case, enabling earlier detecting of the engine 1's being in an acceleration or deceleration state, under the forcible modulation control, is advantageous.

Further, although the engine 1 is an MPI gasoline engine in the described embodiments, the engine 1 may be a type other than the MPI gasoline engine, as long as it can be subjected to the forcible modulation control.

What is claimed is:

1. A fuel control device for an internal combustion engine, comprising:
   an air-fuel ratio setting means which sets combustion air-fuel ratio depending on the operating state of the internal combustion engine,
   a standard fuel quantity setting means which sets standard fuel quantity on the basis of the combustion air-fuel ratio set by the air-fuel ratio setting means,
   a transient state determination means which determines whether or not the internal combustion engine is in a transient state, by a criterion,
   a fuel correction means which makes correction to the standard fuel quantity when the transient state determination means determines that the internal combustion engine is in a transient state, and
   an air-fuel ratio modulation means which oscillates the combustion air-fuel ratio of the internal combustion engine between rich and lean values, periodically, thereby oscillating exhaust air-fuel ratio between rich and lean values, periodically, wherein
   the transient state determination means includes a criterion setting means which sets said criterion, and
   the criterion setting means sets said criterion such that when the exhaust air-fuel ratio is being oscillated by the air-fuel ratio modulation means, whether or not the internal combustion engine is in a transient state is determined by a relaxed criterion, compared with when the exhaust air-fuel ratio is not being oscillated.

2. The fuel control device for the internal combustion engine according to claim 1, wherein said transient state is an acceleration or deceleration state and said transient state determination means determines whether or not the internal combustion engine is in an acceleration or deceleration state, wherein if the transient state determination means determines that the internal combustion engine is in an acceleration state when the exhaust air-fuel ratio being oscillated by the air-fuel modulation means is at a rich value, said fuel correction means makes correction with a decreased acceleration correction quantity, compared with when the exhaust air-fuel ratio is not being oscillated, and if when the exhaust air-fuel ratio being oscillated is at a lean value, said fuel correction means makes correction with an increased acceleration correction quantity, compared with when the exhaust air-fuel ratio is not being oscillated.

3. The fuel control device for the internal combustion engine according to claim 1, wherein said transient state is an acceleration or deceleration state and said transient state determination means determines whether or not the internal combustion engine is in an acceleration or deceleration state, wherein said criterion setting means sets said criterion such that, at least when the exhaust air-fuel ratio being oscillated by the air-fuel ratio modulation means is at a lean value, at least whether or not the internal combustion engine is in an acceleration state is determined by a relaxed criterion, compared with when the exhaust air-fuel ratio is not being oscillated.

4. The fuel control device for the internal combustion engine according to claim 1, wherein said transient state is an acceleration or deceleration state and said transient state determination means determines whether or not the internal combustion engine is in an acceleration or deceleration state, wherein if the transient state determination means determines that the internal combustion engine is in a deceleration state when the exhaust air-fuel ratio being oscillated by the air-fuel modulation means is at a rich value, said fuel correction means makes correction with an increased deceleration correction quantity, compared with when the exhaust air-fuel ratio is not being oscillated, and if when the exhaust air-fuel ratio being oscillated is at a lean value, said fuel correction means makes correction with a decreased deceleration correction quantity, compared with when the exhaust air-fuel ratio is not being oscillated.

5. The fuel control device for the internal combustion engine according to claim 1, wherein a catalytic converter is provided in an exhaust passage of the internal combustion engine, and the air-fuel ratio modulation means oscillates the exhaust air-fuel ratio when a rise in temperature of the catalytic converter is required.

\* \* \* \* \*